United States Patent
Yoshitake et al.

(10) Patent No.: US 6,713,763 B2
(45) Date of Patent: Mar. 30, 2004

(54) OXIDE THIN FILM FOR A BOLOMETER, PROCESS FOR PRODUCING THE SAME, AND INFRARED SENSOR USING THE SAME

(75) Inventors: Tsutomu Yoshitake, Tokyo (JP); Hideto Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 09/985,995

(22) Filed: Nov. 7, 2001

(65) Prior Publication Data

US 2003/0025079 A1 Feb. 6, 2003

(30) Foreign Application Priority Data

Aug. 2, 2001 (JP) ........................................ 2001-235128

(51) Int. Cl.$^7$ ................................................. G01J 5/00
(52) U.S. Cl. ..................................... 250/338.1; 250/330
(58) Field of Search ........................... 250/338.1, 338.2, 250/338.3, 338.4, 339.01, 330, 332

(56) References Cited

U.S. PATENT DOCUMENTS

RE35,872 E * 8/1998 Fenner et al. ............. 250/336.2
6,337,991 B1 * 1/2002 Li et al. ...................... 505/161

FOREIGN PATENT DOCUMENTS

| JP | 9-257565 | 10/1997 |
| JP | 10-163510 | 6/1998 |
| JP | 11-271145 | 10/1999 |
| JP | 2000-95522 | 4/2000 |
| JP | 2000-133848 | 5/2000 |
| JP | 2000-143243 | 5/2000 |

* cited by examiner

Primary Examiner—Constantine Hannaher
Assistant Examiner—Timothy J. Joran
(74) Attorney, Agent, or Firm—Sughrue Mion, PLLC

(57) ABSTRACT

A thin film made of a cobalt-based oxide represented by $YBaCo_2O_{5.5+x}$ ($-0.5<x<0.05$) is used as a resistor material for a bolometer. Provided is also an infrared sensor having a microbridge structure and using the cobalt-based oxide thin film. The temperature coefficient of the electric resistance thereof can be made large.

12 Claims, 1 Drawing Sheet

OXIDE THIN FILM FOR A BOLOMETER, PROCESS FOR PRODUCING THE SAME, AND INFRARED SENSOR USING THE SAME

BACKGROUND OF THE INVENTION

1. Field of the Invention

The present invention relates to an oxide thin film for a bolometer, particularly to an oxide thin film for a bolometer making it possible to make the temperature coefficient of its electric resistance large, a process for producing the same, and a non-cooling type infrared sensor using the same.

2. Description of the Related Art

Hitherto, there has been known a bolometer style, non-cooling type infrared sensor, which is a sensor of absorbing incident infrared rays in its light-receiving portion to cause a change in temperature, and then detecting the radiation intensity of the incident infrared rays by sensing a change in electric resistance generated by the temperature change. A bolometer is a member using a temperature change in the electric resistance of a metal or semiconductor thin film thermally insulated from a substrate material. Properties required for the material for this bolometer are, for example, electric resistance and the temperature coefficient of the electric resistance (referred to as TCR hereinafter). As the electric resistance of the bolometer material becomes larger, Johnson noises in general become larger. Such a case is unfavorable. On the other hand, when the electric resistance becomes small, a difference between the wiring resistance of other than the bolometer and the electric resistance of the bolometer material becomes small. Such a case is also unfavorable. Therefore, it is desirable that the electric resistance of the bolometer material is from about 5 to about 100 kΩ at room temperature. In other words, when the thickness of the resistor thin film for the bolometer is set to 50 to 1000 nm, the electric resistivity required for the bolometer material is desirably from about 0.025 to about 10 Ωcm.

The temperature resolution power (referred to as NETD hereinafter) of an infrared sensor is in inverse proportion to the absolute value of the TCR of the bolometer material thereof. Therefore, by using a bolometer material whose absolute value of TCR is large, an infrared sensor having a small NETD can be obtained. Since the TCR of alloy thin films made of nickel iron alloy or the like is generally as small as about 0.5%/K, the films are not preferred as bolometer materials for high-sensitivity infrared sensors. On the other hand, as disclosed in Japanese unexamined patent publication (KOKAI) No.11-271145, the TCR of a vanadium oxide thin film is relatively large, that is, about 2%/K; therefore, the vanadium oxide thin film is used as a bolometer material. As disclosed in Japanese unexamined patent publication (KOKAI) No.2000-143243, a trial is made wherein a part of vanadium V is replaced by some other element, for example, manganese Mn. This publication reports that the absolute value of the TCR thereof can be improved up to about 4%/K.

As disclosed in, for example, Japanese unexamined patent publication (KOKAI) No.2000-95522, it is investigated to use a unique property that a perovskite Mn oxide such as $La_{1-x}Sr_xMnO_3$ undergoes phase-transition from a high-resistance semiconductor state at high temperature to a low-resistance metal state at low temperature with a change in magnetic property of the oxide. The temperature at which this phase-transition arises can be set to room temperature or similar temperature by adjusting, for example, the composition x of Sr. Since a large change in the electric resistance thereof is caused with this phase-transition, a large TCR can be obtained. In fact, it is reported that this material can give a high TCR of 5%/K or more, particularly about 10%/K. Thus, it is expected that this material is applied to infrared sensors.

As described above, a vanadium oxide thin film can give a TCR of about 2 to 4%/K by an improvement such as a replacement of the element therein. If the phase-transition of perovskite Mn oxides is used, a relatively large TCR of about 5 to 10%/K can be obtained. Therefore, in conventional non-cooling type infrared sensors, it has been investigated to use these materials for resistor thin films for a bolometer. However, in order to make infrared sensors more sensitive and increase the number of pixels thereof from now, it is necessary to develop bolometer materials having a large TCR.

SUMMARY OF THE INVENTION

In light of this situation, an object of the present invention is to provide an oxide thin film for a bolometer making it possible to make the temperature coefficient of its electric resistance large, a process for producing the same, and an infrared sensor.

The oxide thin film for a bolometer of the present invention comprises a cobalt-based oxide represented by $YBaCo_2O_{5.5+x}$ ($-0.5<x<0.05$).

In one example of the oxide thin film for the bolometer of the present invention, at least one part of the Y element in the cobalt-based oxide is replaced by at least one element selected from the group of Pr, Nd, Sm, Eu, Gd, Tb, Dy, and Ho, or at least one compound comprising at least one element selected from the same group.

In one example of the oxide thin film for the bolometer of the present invention, at least one part of the element Ba in the cobalt-based oxide is replaced by at least one selected from the group of Sr and Ca, or at least one compound comprising at least one element selected from the same group.

In one example of the oxide thin film for the bolometer of the present invention, the cobalt-based oxide is formed on an insulating substrate, and this insulating substrate is composed of a thin layer of a perovskite oxide monocrystal. The perovskite oxide monocrystal thin layer is made of $SrTiO_3$, $LaAlO_3$, $NdGaO_3$, or the like.

The process for producing an oxide thin film for a bolometer of the present invention is a process wherein a sol-gel process is used to form the above-mentioned oxide thin film for the bolometer on an insulating substrate.

The process for producing an oxide thin film for a bolometer of the present invention is a process wherein a physical film-forming process is used to form the above-mentioned oxide thin film for the bolometer on an insulating substrate. Examples of the physical film-forming process include sputtering method, and laser ablation method.

The process for producing an oxide thin film for a bolometer of the present invention is a process wherein a solution in which an organic metal compound is dissolved in a solvent, this solvent is applied onto an insulating substrate, the applied solution is dried and subsequently a laser ray is radiated onto the solution to crystallize the solution, thereby forming the above-mentioned oxide thin film for the bolometer.

The infrared sensor of the present invention is a sensor wherein the above-mentioned oxide thin film for the bolometer is used as a resistor (4) for the bolometer.

The infrared sensor of the present invention is a sensor which has a microbridge structure wherein the above-mentioned oxide thin film for the bolometer is thermally separated from a semiconductor substrate (1).

DETAILED DESCRIPTION OF THE PREFERRED EMBODIMENT

[First Embodiment]

Figure 1:
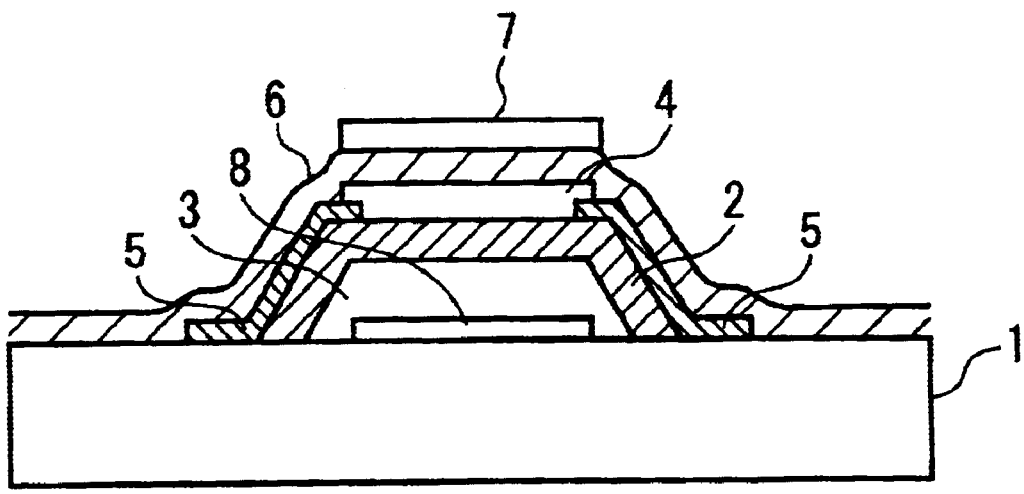
FIG. 1 is a sectional view illustrating one example of an infrared sensor wherein a cobalt-based oxide thin film is used as a resistor for a bolometer in a first embodiment of the present invention.

A first embodiment of the present invention will be in detail described hereinafter. According to the present embodiment, in a bolometer style, non-cooling type infrared sensor in a form of changing temperature by absorbing incident infrared rays to change electric resistance by the temperature change, and reading out a signal of the intensity of the incident infrared rays, a cobalt-based oxide represented by $YBaCo_2O_{5.5+x}$ (−0.5<x<0.05) is used as a thin layer material for the bolometer whose electric resistance is changed by the temperature change.

At or near room temperature, this cobalt-based oxide thin film transits from a low-resistance state at high temperature side to a high-resistnace state at low temperature side. At the high temperature side, the electric resistivity thereof is about several mΩcm. With the above-mentioned transition, however, the electric resistivity increases by two figures, that is, the electric resistivity rises up to about 100 mΩcm at the low temperature side. Therefore, a large TCR can be obtained at or near this transition point. The temperature at which the transition from the low-resistance state to the high-resistance state arises can be adjusted to a desired temperature by changing the oxygen concentration x, or the added amount of elements selected from the following or a combination thereof: rare earth elements such as praseodymium (Pr), medium (Nd), samarium (Sm), europium (Eu), gadolinium (Gd), terbium (Tb), dysprosium (Dy) and holmium (Ho), and alkali earth metals such as strontium (Sr), and calcium (Ca). When x is set to about zero in $YBaCo_2O_{5.5+x}$ (−0.5<x<0.05), the temperature can be adjusted to about 290K.

In the case that the cobalt-based oxide is made into a thin film by a sol-gel process, octane-based coating agents of component metals or the like are sufficiently uniformly mixed in a desired ratio and subsequently a spin coater is used to rotation-apply the mixture to an insulating substrate. It is preferred to use, as the insulating substrate, a perovskite oxide monocrystal thin film which has a lattice constant and a thermal expansion coefficient similar to those of the cobalt oxide and can be epitaxially grown, for example, $SrTiO_3$, $LaAlO_3$ or $NdGaO_3$.

The substrate onto which the mixture solution is applied is dried at 150° C. for about 30 minutes to remove the solvent in the mixture solution. Thereafter, the substrate is pre-fired at about 500° C. for 30 minutes. The steps of the rotation-application, the drying and the pre-firing are repeated until a desired film thickness is obtained. Finally, the substrate is annealed at a high temperature of 700 to 900° C. to form a thin film. The perovskite oxide monocrystal thin film of $SrTiO_3$ or the like is usually formed on a Si wafer.

In the case that the cobalt-based oxide thin film is formed by a physical film-forming process such as sputtering or laser-ablation, for example, a target of a sintered body of the cobalt-based oxide is used to evaporate components of this target by sputtering or laser-ablation. The perovskite oxide monocrystal thin film as a substrate, which is made of $SrTiO_3$, is heated at about 700° C., and subsequently the surrounding atmosphere is controlled into an oxygen-containing atmosphere, the partial pressure of the oxygen being from about $10^{-3}$ to about $10^{-1}$ Torr, so as to deposit evaporation components on the substrate. In this way, it is possible to form a cobalt-based oxide thin film having a desired crystal structure.

Furthermore, an organic metal compound is dissolved into a solvent to make a solution, and then this is applied to an insulating substrate and dried. Thereafter, a laser ray having a wavelength of 400 nm or less is radiated thereon to decompose the compound. By crystallizing the resultant oxide, it is also possible to form a cobalt-based oxide thin film having a desired crystal structure. In this case, the thin film can be formed at a low temperature of 500° C. or less by an affect of photolysis reaction based on the laser ray radiation.

FIG. 1 illustrates one example of an infrared sensor using a cobalt oxide thin film as described above as a resistor material for a bolometer. This infrared sensor has a microbridge structure. In other words, its bolometer structure is made to a diaphragm structure wherein the bolometer is separated from a silicon substrate by providing an air gap and the diaphragm structure is supported by beams made of silicon nitride or the like.

In FIG. 1, reference number 1 represents the substrate made of silicon (Si) or the like; reference number 2, a bridge structure composed of a bilayer of silicone oxide film and a perovskite oxide monocrystal thin film made of $SrTiO_3$ or the like; reference number 3, the air gap; reference number 4, a resistor for the bolometer; reference number 5, an interconnect; reference number 6, a protective layer; reference number 7, an infrared ray absorbing film; and reference number 8, an infrared ray reflecting film.

As illustrated in FIG. 1, a bolometer type infrared sensor generally has the microbridge structure wherein the bolometer resistor 4 is isolated from the substrate 1 by the air gap 3. Therefore, the bolometer resistor 4 can be thermally isolated from the substrate 1. In the present embodiment, as the bolometer resistor 4, the above-mentioned cobalt oxide thin film is used.

According to the structure illustrated in FIG. 1, when infrared rays are radiated into the cell of the sensor, a part of the rays is first absorbed in the infrared ray absorbing film 7 and then the penetrating infrared ray is also reflected on the infrared ray reflecting film 8. As a result, the incident infrared rays are completely absorbed in the infrared ray absorbing film 7. The absorbed infrared rays turn into heat so that the diaphragm is heated. In this way, the electric resistance of the bolometer resistor 4 is changed. The bolometer resistor 4 and a non-illustrated readout circuit formed in the substrate 1 are connected to each other through the interconnect 5 extended from both ends of the bolometer resistor 4 to the substrate 1 through supporting legs of the bridge structure 2. In this way, the change in the electric resistance of the bolometer resistor 4 is detected, as a signal representing the intensity of the incident infrared rays, in the readout circuit.

[Second Embodiment]

A second embodiment of the present invention will be in detail described hereinafter. As the present embodiment, the cobalt-based oxide thin film of the first embodiment will be more specifically described. In the present embodiment, a sol-gel solution was used to form the cobalt-based oxide thin film. Octane-based coating agents of Y, Ba and Co were uniformly mixed in a desired ratio. A spin coater was used to apply this mixture solution to an insulating substrate. For the insulating substrate, a $SrTiO_3$ monocrystal thin film formed on the Si substrate was used. Concerning conditions of the spin coater, the mixture solution was applied onto the insulating substrate and subsequently the coater was rotated at 2000 rpm for 30 seconds.

The insulating substrate onto which the mixture solution was applied was dried at 150° C. for about 30 minutes to remove the solvent in the mixture solution. Thereafter, the substrate was pre-fired at about 500° C. for 30 minutes to remove the organic components. The steps of the rotation-application, the drying and the pre-firing were repeated to give a film thickness of about 300 nm. Next, the substrate was annealed at a high temperature of 800° C. in the air to form a desired cobalt oxide thin film.

The structure of the formed cobalt-based oxide thin film was evaluated by X-ray diffraction analysis. As a result, it was proved that the cobalt-based oxide was a cobalt-based oxide whose c axis was oriented perpendicularly to the substrate face. Furthermore, the structure in the substrate face was also evaluated. It was found out that the a axis and the b axis of the thin film grew to be consistent with the directions of the substrate and the thin film grew epitaxially. The magnetic property of the thin film was measured with a magnetic sensor called SQUID (Superconducting Quantum Interference Device). As a result, the thin film was transited at about 290K from a paramagnetic state at high temperature side to a ferromagnetic state at low temperature side.

A change in the electric resistance of the thin film, depending upon temperature, was measured by a quadrupole method while the temperature thereof was lowered from the high temperature side. As a result, it was proved that at about 295K the electric resistance increased rapidly by two figures so that the film was transited from a low-resistance state to a high-resistance state. With this transition, a large TCR of about 15%/K was obtained. This value is far larger than the TCR of conventional vanadium-based thin films (about 2 to 4%/K) and that of perovskite Mn-based thin films (about 5 to 10%/K). The electric resistivity at about 295K is about 3 mΩcm at the high temperature side, and is about 100 mΩcm at the low temperature side. Thus, the electric resistivity falls within the range of the electric resistivity required for bolometer materials. As described above, according to the present embodiment, a cobalt-based thin film having a large TCR can be provided; therefore, the present embodiment is very advantageous as resistor materials for a bolometer.

[Third Embodiment]

A third embodiment of the present invention will be in detail described hereinafter. In the present embodiment, a cobalt-based thin film was formed by laser evaporation. A sintered body target wherein Y of the above-mentioned cobalt-based oxide was doped with 1% Pr was set in a laser evaporation chamber. As a substrate, a $LaAlO_3$ monocrystal thin film made on a Si plate was used. The chamber was subjected to evacuation and subsequently the temperature of the substrate was heated to about 700° C. oxygen gas was introduced thereto until the partial pressure of the oxygen gas was about $10^{-3}$ to $10^{-1}$ Torr. Next, a KrF exima laser having a wavelength of 248 nm was radiated onto the sintered body target to evaporate the target components. As a result, a desired cobalt-based oxide thin film grew on the $LaAlO_3$ thin film. The film thickness of the thin film was set to 250 nm.

The structure of the formed cobalt-based oxide thin film was evaluated by X-ray diffraction analysis. As a result, it was proved that in the same manner as in the second embodiment the cobalt-based oxide was a cobalt-based oxide whose c axis was oriented perpendicularly to the substrate face and that the thin film was a epitaxially-growing thin film, wherein the directions in the substrate face were regular. A change in the electric resistance of the thin film, depending upon temperature, was measured by a quadrupole method while the temperature thereof was lowered from high temperature side. As a result, it was proved that at about 300K the electric resistance increased rapidly by two figures thereof so that the film was transited from a low-resistance state to a high-resistance state. With this transition, a large TCR of about 18%/K was obtained. It is allowable to use, as the film-forming process, a process other than the laser evaporation, for example, sputtering.

[Fourth Embodiment]

A fourth embodiment of the present invention will be in detail described hereinafter. As the present embodiment, the infrared sensor of the first embodiment will be more specifically described. In the present embodiment, a metal having a high reflectivity against infrared rays, for example, WSi was formed into a film by sputtering on the substrate 1 on which the readout circuit (not illustrated) was formed, so as to form the infrared ray reflecting film 8.

A sacrifice layer composed of, for example, a polycrystal silicon film was formed on this infrared ray reflecting film 8 and at a position corresponding to the air gap 3. An insulating film made of SiN or $SiO_2$ was formed on this sacrifice layer by plasma CVD. Furthermore, a $SrTiO_3$ thin film was deposited on the insulating film to form the bridge structure 2. Next, a film of a metal having a small thermal conductivity, for example, Ti and the like was formed on the bridge structure 2 by sputtering, and then Ti was worked in light-exposing, developing and etching steps to form the interconnect 5.

Next, three solutions of organic metal compound solutions in toluene, that is, a solution of Y naphthenoate, a solution of Ba naphthenoate and a solution of Co naphthenoate were prepared in such a manner that the ratio of Y, Ba, Co would be 1:1:2. The bridge structure 2 was spin-coated with these solutions, and subsequently the solution layer was dried at 200° C. for 10 minutes. Next, on the bridge structure 2 was formed a mask having such a shape that a laser ray having a wavelength of 400 nm or less would penetrate through only the pattern portion of the bolometer resistor 4. An ArF excimer laser ray (10 mJ/cm² and 50 Hz) was radiated to the solution applied to the bridge structure 2 in the atmosphere at 400° C. for 30 seconds. Furthermore, an ArF excimer laser ray (50 mJ/cm² and 10 Hz) was radiated thereto in the atmosphere at 400° C. for 5 minutes. The laser radiation was repeated 5 times.

In this way, the solution irradiated with the laser ray was crystallized into a cobalt-based oxide, and portions irradiated with no laser ray underwent no change so that the portions remained in the state of the organic metal compounds. When washing with an organic solution was performed after the radiation of the laser ray, the non-irradiated portions were dissolved and selectively removed so that the cobalt-based thin film remained in only the portion of the bolometer resistor 4. Next, an insulating film made of SiN or $SiO_2$ was formed on the thus formed bolometer resistor 4 by plasma CVD, to form the protective film 6. The infrared ray absorbing film 7 made of TiN or the like was formed on this protective film 6 by reactive sputtering. After the formation of the infrared ray absorbing film 7, the sacrifice layer was wet-etching with hydrazine or the like to make the air gap 3. By the above-mentioned method, a diaphragm having a structure thermally isolated from the substrate 1 was produced.

The principle that the produced cell was operated as an infrared sensor is as follows. When infrared rays are radiated into the cell, a part thereof is first absorbed into the infrared ray absorbing film 7. The penetrating infrared rays are also reflected on the infrared ray reflecting film 8 so that the incident infrared rays are completely absorbed into the infrared ray absorbing film 7. The absorbed infrared rays turn into heat, so that the diaphragm is heated so as to change the electric resistance of the bolometer resistor 4. The temperature resolution power (NETD) of the thus produced infrared sensor is able to be lowered to ¼ of that of infrared sensors using a conventional vanadium-based oxide thin film as the bolometer resistor 4.

In the case that a conventional vanadium-based oxide or the like is used as the bolometer resistor 4, the NETD becomes large when the area of the cell is made small. That is, the temperature resolution power of the infrared sensor deteriorates. On the other hand, when the cobalt-based thin film is used as the bolometer resistor 4 as in the present invention, the TCR is very large so that the NETD can be kept at the level of conventional sensors or lower. Therefore, the present invention can be adapted for an increase in the number of pixels of infrared sensors. The present invention is not limited to the above-mentioned embodiments, and it is evident that the present invention can be appropriately varied within the range of the technical concept of the present invention.

At least one part of the yttrium (Y) element in the cobalt-based oxide of $YBaCo_2O_{5.5+x}$ ($-0.5<x<0.5$) maybe replaced by at least one element selected from the group of Pr, Nd, Sm, Eu, Gd, Tb, Dy, and Ho, or at least one compound comprising at least one element selected from the same group. At least one part of the barium (Ba) element in the cobalt-based oxide of $YBaCo_2O_{5.5+x}$ ($-0.5<x<0.5$) may be replaced by at least one selected from the group of Sr and Ca, or at least one compound comprising at least one element selected from the same group.

According to the present invention, the temperature coefficient of the electric resistance of an oxide thin film for a bolometer can be made large by using the cobalt-based oxide. Therefore, when the oxide thin film for a bolometer of the present invention is used as a resistor for the bolometer, it is possible to realize a non-cooling type infrared sensor having a superior temperature resolution power and a high sensitivity. As a result, the present invention can be adapted for an increase in the number of pixels of infrared sensors.

What is claimed is:

1. An oxide thin film for a bolometer, a resistance of which changes dependently on a temperature change following incidence of infrared rays, comprising a cobalt-based oxide represented by $YBaCo_2O_{5.5+x}$ ($-0.5<x<0.05$).

2. The oxide thin film for the bolometer according to claim 1, wherein at least one part of the Y element in said cobalt-based oxide is replaced by at least one element selected from the group of Pr, Nd, Sm, Eu, Gd, Tb, Dy, and Ho, or at least one compound comprising at least one element selected from the same group.

3. The oxide thin film for the bolometer according to claim 1, wherein at least one part of the element Ba in said cobalt-based oxide is replaced by at least one element selected from the group of Sr and Ca, or at least one compound comprising at least one element selected from the same group.

4. The oxide thin film for the bolometer according to claim 1, wherein said cobalt-based oxide is formed on an insulating substrate, and said insulating substrate is composed of a thin layer of a perovskite oxide monocrystal.

5. A fabricating method of an oxide thin film comprising a cobalt-based oxide represented by $YBaCo_2O_{5.5+x}$ ($-0.5<x<0.05$) for a bolometer, wherein said method comprising the step of:

forming said oxide thin film on an insulating substrate using a sol-gel process.

6. A fabricating method of an oxide thin film comprising a cobalt-based oxide represented by $YBaCo_2O_{5.5+x}$ ($-0.5<x<0.05$) for a bolometer, wherein said method comprising the step of:

forming said oxide thin film on an insulating substrate using a physical film-forming process.

7. A fabricating method of an oxide thin film comprising a cobalt-based oxide represented by $YBaCo_2O_{5.5+x}$ ($-0.5<x<0.05$) for a bolometer, wherein said method comprising the steps of:

applying onto an insulating substrate a solution in which an organic metal compound is dissolved in a solvent, drying said applied solution on said insulating substrate, and radiating a laser ray onto said solution so as to crystallize said solution.

8. An infrared sensor having an oxide thin film comprising a cobalt-based oxide represented by $YBaCO_2O_{5.5+x}$ ($-0.5<x<0.05$) used as a resistor member of a bolometer.

9. The infrared sensor according to claim 8, wherein at least one part of the Y element in said cobalt-based oxide is replaced by at least one element selected from the group of Pr, Nd, Sm, Eu, Gd, Tb, Dy, and Ho, or at least one compound comprising at least one element selected from the same group.

10. The infrared sensor according to claim 8, wherein at least one part of the element Ba in said cobalt-based oxide is replaced by at least one element selected from the group of Sr and Ca, or at least one compound comprising at least one element selected from the same group.

11. The infrared sensor according to claim 8, wherein said cobalt-based oxide is formed on an insulating substrate, and said insulating substrate is composed of a thin layer of a perovskite oxide monocrystal.

12. The infrared sensor according to claim 8, wherein said infrared sensor comprises a microbridge structure in which said oxide thin film for said bolometer is thermally separated from a semiconductor substrate.

* * * * *

UNITED STATES PATENT AND TRADEMARK OFFICE
CERTIFICATE OF CORRECTION

| | |
|---|---|
| PATENT NO. | : 6,713,763 B2 |
| APPLICATION NO. | : 09/985995 |
| DATED | : March 30, 2004 |
| INVENTOR(S) | : Yoshitake et al. |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 148 days Delete the phrase "by 148 days" and insert -- by 268 days --

Signed and Sealed this

Twenty-ninth Day of April, 2008

JON W. DUDAS
*Director of the United States Patent and Trademark Office*